No. 810,306. PATENTED JAN. 16, 1906.
D. W. ROBBINS.
LINE FASTENER.
APPLICATION FILED NOV. 5, 1904.
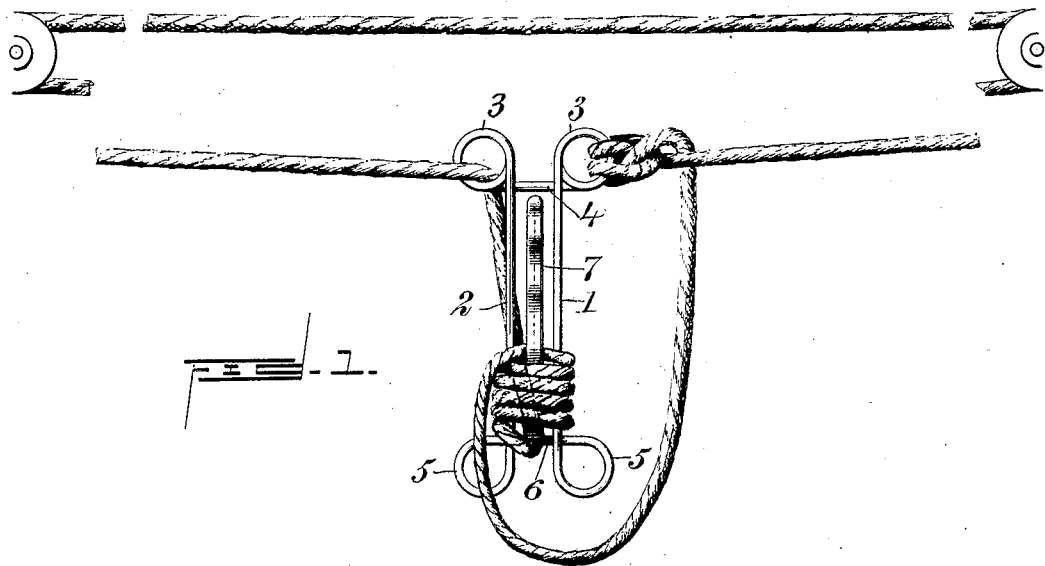
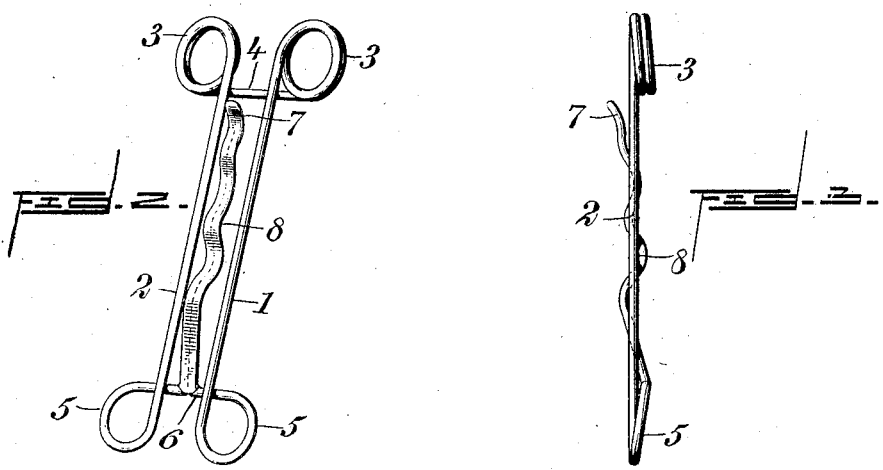
WITNESSES:
INVENTOR
David W. Robbins
BY
ATTORNEYS

UNITED STATES PATENT OFFICE.

DAVID W. ROBBINS, OF NEW YORK, N. Y.

LINE-FASTENER.

No. 810,306.   Specification of Letters Patent.   Patented Jan. 16, 1906.

Application filed November 5, 1904. Serial No. 231,469.

*To all whom it may concern:*

Be it known that I, DAVID W. ROBBINS, a citizen of the United States, and a resident of the city of New York, borough of Brooklyn, in the county of Kings and State of New York, have invented a new and Improved Line-Fastener, of which the following is a full, clear, and exact description.

This invention relates to improvements in devices for securing the ends of and taking up the slack of clothes-lines or the like, the object being to provide a device of this character that will be simple and inexpensive in construction and by means of which the slack of the line may be easily taken up and secured.

I will describe a line-fastener embodying my invention and then point out the novel features in the appended claims.

Reference is to be had to the accompanying drawings, forming a part of this specification, in which similar characters of reference indicate corresponding parts in all the figures.

Figure 1 shows a line-fastener embodying my invention in connection with the line. Fig. 2 is a perspective view of the device, and Fig. 3 is a side view thereof.

The fastener as here shown consists of a single length of wire bent to form side members 1 2, which at the upper end are provided with oppositely-arranged eyes or coils 3, to one of which the line is designed to be secured, while through the other eye the line loosely passes, as indicated in Fig. 1. The coils 3 are connected by a cross-bar 4, and the lower ends of the side members are curved to form oppositely-arranged eyes 5, connected by a cross-bar 6, from which a fastening or tongue member 7 extends upward between the side members. This tongue member 7 is made sinuous or provided with depressions 8, which receive the line and prevent its upward or downward movement, it being understood that this tongue member is resilient, and therefore when the line is engaged therewith and with the side members a considerable pressure is brought to bear upon the line, and this pressure is considerably increased by the cross-bar 6 engaging with the rear sides of the side members 1 and 2, which has a tendency to force the tongue member rearward.

The operation of the device is quite obvious from Fig. 1—that is, the line is secured to one of the eyes at the upper end of the fastening and another portion of the line is drawn through the other eye, and then in taking up the slack the line is wound around the body portions or side members and carried underneath the tongue 7.

Having thus described my invention, I claim as new and desire to secure by Letters Patent—

1. A line-fastener, consisting of a body formed of a piece of wire bent to form straight and approximately parallel side members spaced apart, each formed with a laterally-projecting coil at its upper end, the coils extending in opposite directions and connected together by a cross-bar extending across the side members, the lower ends of the side members being bent to form eyes, said eyes projecting in opposite directions and connected by a cross-bar extending across the side members, and a sinuous tongue secured to the cross-bar connecting the eyes, between the side members and extending upwardly between the said side members in direction of the cross-bar connecting the coils.

2. A line-fastener, comprising straight and approximately parallel side members spaced apart, a pair of oppositely-arranged eyes at each end of the side member, the eyes of each pair projecting in opposite direction, a cross-bar connecting the eyes of each pair of eyes and extending across the side members, and a spring-tongue secured to one cross-bar between the side members, and extending between the said side members in direction of the other cross-bar.

3. A line-fastener, comprising two straight and approximately parallel side members, spaced apart, said members being connected together near each end by a cross-bar, and provided at one end with a pair of oppositely-arranged eyes, the eyes projecting in opposite directions, and a spring-tongue secured to one cross-bar between the side members, and extending between the said side members in direction of the other cross-bar.

In testimony whereof I have signed my name to this specification in the presence of two subscribing witnesses.

DAVID W. ROBBINS.

Witnesses:
 NEVA E. ROBBINS,
 DAVID W. ROBBINS, Jr.